(12) United States Patent
Macher et al.

(10) Patent No.: US 6,234,636 B1
(45) Date of Patent: May 22, 2001

(54) ELECTROCHROMIC LAYER SYSTEM IN PARTICULAR FOR MOTORCAR

(75) Inventors: David Macher; Heinz Zorn, both of Osterreich (AT)

(73) Assignee: Magna Reflex Holding GmbH, Assamstadt (DE)

(*) Notice: Subject to any disclaimer, the term of this patent is extended or adjusted under 35 U.S.C. 154(b) by 0 days.

(21) Appl. No.: 09/552,490

(22) Filed: Apr. 18, 2000

Related U.S. Application Data

(62) Division of application No. 09/285,925, filed on Apr. 4, 1999, now Pat. No. 6,074,066.

(30) Foreign Application Priority Data

Apr. 2, 1998 (DE) .................................................. 19816352

(51) Int. Cl.⁷ .................................................. G02B 27/00
(52) U.S. Cl. .......................... 359/601; 359/602; 359/603; 359/265; 359/267
(58) Field of Search ..................................... 359/601, 602, 359/603, 604, 265, 267, 270, 271, 272, 273

(56) References Cited

U.S. PATENT DOCUMENTS

| | | | |
|---|---|---|---|
| 4,623,222 | 11/1986 | Itoh et al. | 349/195 |
| 5,069,535 * | 12/1991 | Baucke et al. | 359/273 |
| 5,076,674 | 12/1991 | Lynam | 359/603 |
| 5,223,976 * | 6/1993 | Fujie et al. | 359/507 |
| 5,536,808 * | 7/1996 | Curtis et al. | 528/377 |
| 5,581,406 | 12/1996 | Kobayashi et al. | 359/604 |
| 5,640,274 | 6/1997 | Iwama et al. | 359/274 |
| 5,668,663 | 9/1997 | Varaprasad et al. | 359/603 |
| 5,673,150 | 9/1997 | Ono et al. | 359/603 |
| 5,682,267 | 10/1997 | Tonar et al. | 359/603 |
| 5,689,370 | 11/1997 | Tonar et al. | 359/603 |
| 5,724,187 | 3/1998 | Varaprasad et al. | 359/603 |
| 5,948,557 * | 9/1999 | Onedeck et al. | 429/33 |

* cited by examiner

Primary Examiner—Mohammad Sikder
(74) Attorney, Agent, or Firm—Clark Hill PLC

(57) ABSTRACT

An electrochromic layer system, in particular for motorcar mirrors, comprising one first transparent, electrically conductive layer deposited on a glass carrier and serving as an electrode, one electrochromic layer, one second electrically conductive layer serving as a backplate electrode, and one reflecting layer. The electrochromic layer includes at least one oxidation-reduction layer as a metal oxide layer or a polymer layer having a conjugate double bond system, which is deposited upon the electrode. Hence, preferably a storage layer for ions is also provided.

15 Claims, 1 Drawing Sheet

ELECTROCHROMIC LAYER SYSTEM IN PARTICULAR FOR MOTORCAR

RELATED APPLICATION

This application is a divisional of U.S. Ser. No. 09/285,925, filed Apr. 4, 1999, now U.S. Pat. No. 6.074.066.

The invention relates to an electrochromic layer system, in particular for motorcar mirrors.

BACKGROUND OF THE INVENTION

There are known motorcar mirrors, which can be dipped and comprise an electrochromic layer system, wherein the electrochromic substances are formed as gels or liquids. The electrochromic substances are collected inside a layer structure having electrode layers, further reaction layers of a mirror layer, if necessary, and a final glass. The motorcar mirror having such a layer structure includes a sensor arrangement for radiation impinging upon the mirror, and depending on the signals of one or more sensors the electrochromic layer is triggered via the electrodes such that the transmission of the layer is controlled depending on the brightness.

With these well-known mirrors and layer structures, respectively, the electrochromic liquid or gel-like layer has to be sealed outwards, whereby the manufacturing effort is increased. Moreover, it is extremely difficult with the curved mirrors to constantly maintain the distance between the limiting surfaces of the electrochromic layer and thus the curvature thereof. If the distance of the limiting surfaces and its curvature, respectively, change to each other, the optical features deteriorate.

SUMMARY OF THE INVENTION

The subject invention is an electrochromic layer system for motorcar mirrors comprising a first transparent, electrically conductive layer serving as an electrode, which is deposited upon a glass carrier, a electrochromic layer, a second electrically conductive layer serving as a backplate electrode and a reflecting layer. The system is characterized by the electrochromic layer comprising an oxidation-reduction layer deposited on the electrode.

Hence the invention is based on the object, to provide an electrochromic layer structure, in particular for motorcar mirrors, which is less expensive in its structure and comprise good optics.

As a result of forming the electrochromic layer as an oxidation-reduction layer directly deposited upon the electrode, on the one hand, and as an organic polymer layer having a conjugate double bond system, on the other hand, layer thicknesses may be exactly observed, in particular with curved substrates as well, such that the optics of the mirror are not impaired. Moreover, manufacturing the mirror is simpler, since the layer structure does not have to be sealed.

BRIEF DESCRIPTION OF THE DRAWINGS

Other advantages of the present invention will be readily appreciated as the same becomes better understood by reference to the following detailed description when considered in connection With the accompanying drawings wherein.

DETAILED DESCRIPTION OF A PREFERRED EMBODIMENT

Figure 1:
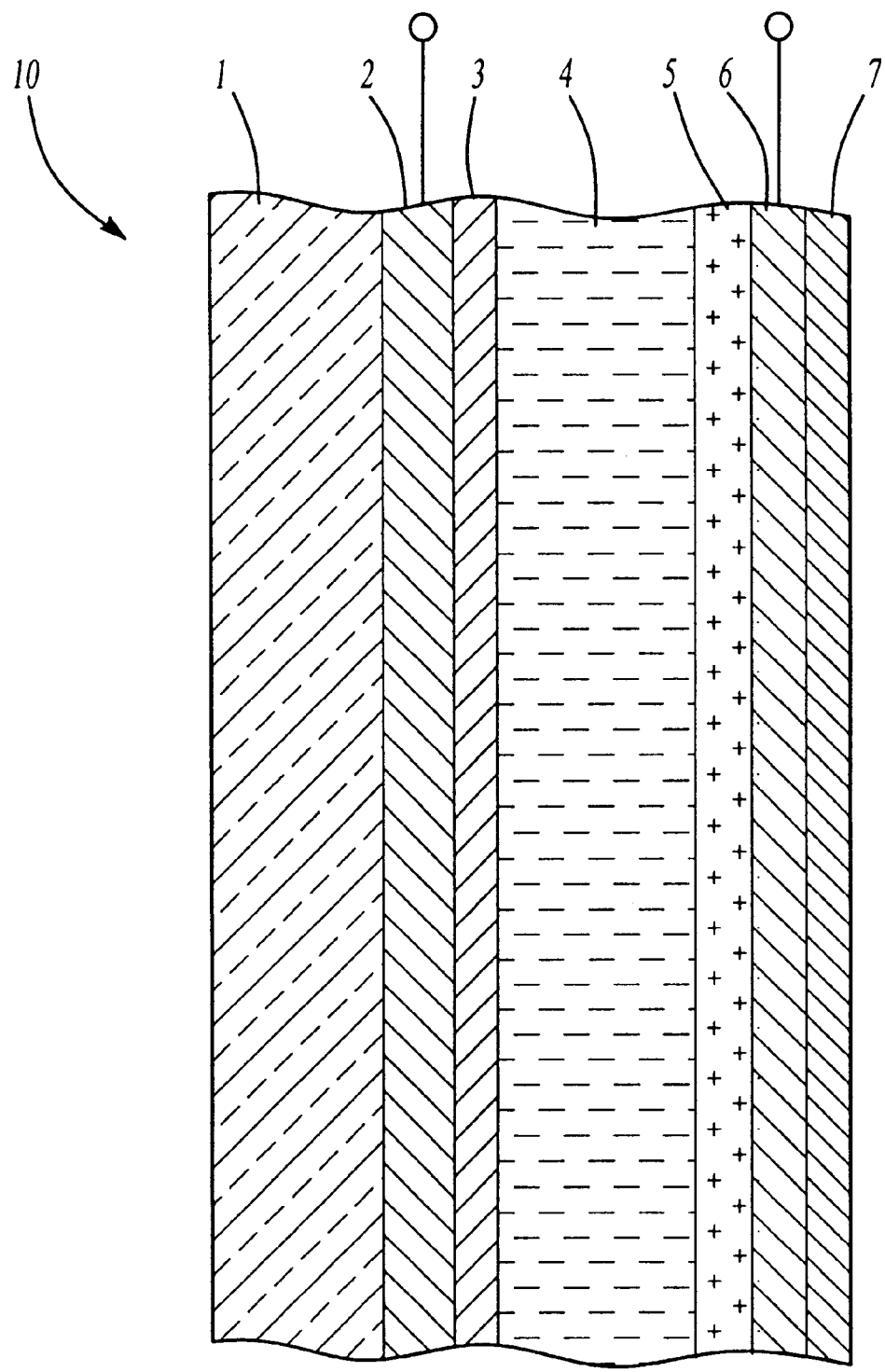
FIG. 1 is a cross-sectional view of an electrochromic layer system according to the preferred embodiment.

Referring to FIG. 1, an electrochromic mirror is generally shown at 10 and comprises a first layer, or substrate, 1 formed as a glass, upon which the subsequent layers are deposited. A transparent, electrically conductive coating, or electrode layer 2 is directly deposited onto the substrate 1 by cathode sputtering, for example, which includes a possibly less electric surface resistance. The electrode 2 is composed of indium tin oxide, for example. An oxidation-reduction (redox) layer 3 of tungsten oxide, i.e. $Wo_3$, is directly deposited as a dry film upon the electrode 2 by high-vacuum sputtering, which has electrochromic characteristic features by virtue of oxidation-reduction reactions. The tungsten oxide comprises a spectral distribution with respect to the transmission, which is similar to V () curve. The layer thickness of the tungsten oxide layer 3 may be adapted to the desired deepening grade. It is about between 100 and 1000 Angström units.

Instead of tungsten oxide, other metal oxides such as nickel oxide, cobalt oxide, indium oxide and others may be used, wherein the choice depends on the desired spectral distribution, For controlling the oxidation-reduction reactions, a catalyst layer 4 is deposited upon the tungsten oxide layer 3 by vacuum evaporation, sputtering or the like, which layer comprises metals such as platinum, rhodium, palladium or the like. A storage layer 5 is deposited upon the catalyst layer 4, which for example is comprises a polymer such as polypropylene or polymethylmethacrylate (PMMA) and which for example may be formed as a microporous or nanoporous film. This storage layer 5 serves for the storage of protons, that means of ions being required for the oxidation-reduction reaction (for example $H^+$ or $Li^+$), which are brought in as water for example in a preparatory treatment step or as lithium salt.

Another electrically conductive layer 6, or backplate electrode is deposited upon the storage layer 5, which may simultaneously serve as a reflecting mirror layer, wherein in this case it is composed of chromium. However, it is also conceivable that such backplate electrode 6 to be made translucent and a separate mirror layer may be arranged thereover. Finally, a cover layer 7 in form of a protection film is drawn, and added to the electrode layer 6 to protect the entire structure against corrosion.

In another embodiment, in a first step the backplate electrode 6 may be cathodic sputtered upon a glass substrate such that a mirror is formed and subsequently the layers 1 to 5 and the mirror are combined to a composite structure.

Light radiation impinging upon the layer system is transmitted through the layers 1 to 5 and reflected on the mirror layer 6 and again transmitted through the layers 5 to 1. When no current is applied to the electrode 2 and the backplate electrode 6, the electrochromic layer composed of the tungsten oxide layer 3, catalyst layer 4 and storage layer 5 has its inherent maximum degree of transmission.

With applying a voltage to the electrodes 2 and 6, an ionic current between the storage layer 5 and the tungsten oxide layer 3 takes place, i.e., the moisture stored inside the storage layer 5, e.g. water, decomposes into $H^+$ and $OH^-$ radicals, and an oxidation reaction and reduction reaction, respectively, takes place depending on the direction of the applied voltage. The catalyst layer 4 allows the hydrogen to diffuse more easily into the oxide layer and thus serves for reducing the activation barrier and accelerates the reaction and enables the use of a lower voltage. The colour and the degree of transmission, respectively, change by virtue of the electrochromic reaction such that the mirror is "deepened" and returns again in the original condition during a subsequent direction variation of the applied voltage.

In the explained embodiment comprising tungsten oxide, deepening is nearly possible within the entire visible range of wave lengths, i.e. the bell curve shaped spectral distribution becomes flattened in the "dark" condition.

In another embodiment, the electrochromic layer is realized by an organic polymer layer having a conjugate double bond system, i.e. the tungsten oxide layer 3 and the catalyst layer 4 (if available) is substituted by such an organic polymer layer.

The organic polymer layer, which can be dopened for changing the electron structure such that the reaction is supported, in a dipping method, for example, is deposited upon the transparent electrode layer 2 according to the figure.

The storage layer used in the first embodiment may be maintained in connection with the organic polymer layer. Further structure with respect to the backplate electrode and reflecting layer is as described above.

The dopened organic materials as active substance have a similar electrochemical reaction behavior with respect to the oxidation and reduction, wherein a change in the course of the curve is achieved within the visible spectral range as described above. The organic polymer can be selected from polyparaphenylene, methyl substituted conductor-type polyparaphenylene, polythiophene, parahexaphenyl and polyindenefluorene. Hence, according to the desired spectral features, the organic polymer layer may be composed of a combination of two or more materials and several layers of such materials can be provided, respectively.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced other than as specifically described.

What is claimed is:

1. An electrochromic layer system, in particular for motorcar mirrors, comprising a first transparent, electrically conductive layer serving as an electrode, which is deposited on a glass carrier, an electrochromic layer adjacent to and in direct contact with said first electrically conductive layer, a second electrically conductive layer adjacent to and in direct contact with said electrochromic layer, said second electrically conductive layer serving as both a backplate electrode and a reflecting layer, characterized by said electrochromic layer comprising an organic polymer layer having a conjugate double bond system.

2. An electrochromic layer system according to claim 1 further characterized by said organic polymer layer is dopened with a material promoting the separation of ions.

3. An electrochromic layer system according to claim 2 further characterized by said electrochromic layer comprising a storage layer for ions in addition to said organic polymer layer, said storage layer adjacent said second electrically conductive layer.

4. An electrochromic layer system according to claim 3 further characterized by said organic polymer is selected from the series of the organic materials polyparaphenylene (PPP), methyl substituted conductor-type polyparaphenylene (mLPPP), polythiophene (PT), parahexaphenyl (PHP) and polyidenefluorene (PIF).

5. An electrochromic layer system according to claim 4 further characterized by said organic polymer layer comprises a combination of two or more organic materials.

6. An electrochromic layer system according to claim 5 further characterized by two or more organic polymer layer of different organic materials are provided.

7. An electrochromic layer system according to claim 6 further characterized by said storage layer is a microporous layer of polymer.

8. An electrochromic layer system according to claim 7 further characterized by said backplate electrode (6) is simultaneously formed as a reflecting layer.

9. An electrochromic layer system according to claim 8 further characterized by said backplate electrode is sputtered upon a glass carrier.

10. An electrochromic layer system according to claim 9 further characterized by a protective layer adjacent said second electrically conductive layer for protecting said electrochromic layer system.

11. An electrochromic layer system according to claim 5 further characterized by two or more organic polymer layers of different combination of organic materials are provided.

12. An electrochromic layer system according to claim 6 further characterized by said storage layer is a nanoporous layer of polymer.

13. An electrochromic layer system according to claim 6 further characterized by said storage layer of a micropolymer layer of polymer comprises polypropylene.

14. An electrochromic layer system according to claim 12 further characterized by said storage layer of a nanoporous layer of polymer comprises PMMA.

15. An electrochromic layer system, in particular for motorcar mirrors, comprising: a first transparent, electrically conductive layer serving as an electrode, which is deposited on a glass carrier; a second electrically conductive layer serving as both a backplate electrode and a reflecting layer; an electrochromic layer sandwiched between and in direct contact with each of said first electrically conductive layer and said second electrically conductive layer, said electrochromic layer comprising an organic polymer layer having a conjugate double bond system and a storage layer for ions; and a protective layer adjacent said second electrically conductive layer for protecting said electrochromic layer system.

* * * * *